(No Model.)

J. A. SCHULER.
HUB FOR WHEELS.

No. 342,641. Patented May 25, 1886.

WITNESSES:
Jno. W. Strehlix
O. M. Hill

INVENTOR
John A. Schuler

UNITED STATES PATENT OFFICE.

JOHN A. SCHULER, OF MILLVILLE, OHIO.

HUB FOR WHEELS.

SPECIFICATION forming part of Letters Patent No. 342,641, dated May 25, 1886.

Application filed May 4, 1885. Serial No. 164,292. (No model.)

*To all whom it may concern:*

Be it known that I, JOHN A. SCHULER, a resident of Millville, Butler county, Ohio, have invented certain new and useful Improvements in Hubs for Staggered Wheels.

The various features of my invention and their advantages, either conjointly or separately, will be apparent from the following specification.

Figure 1:
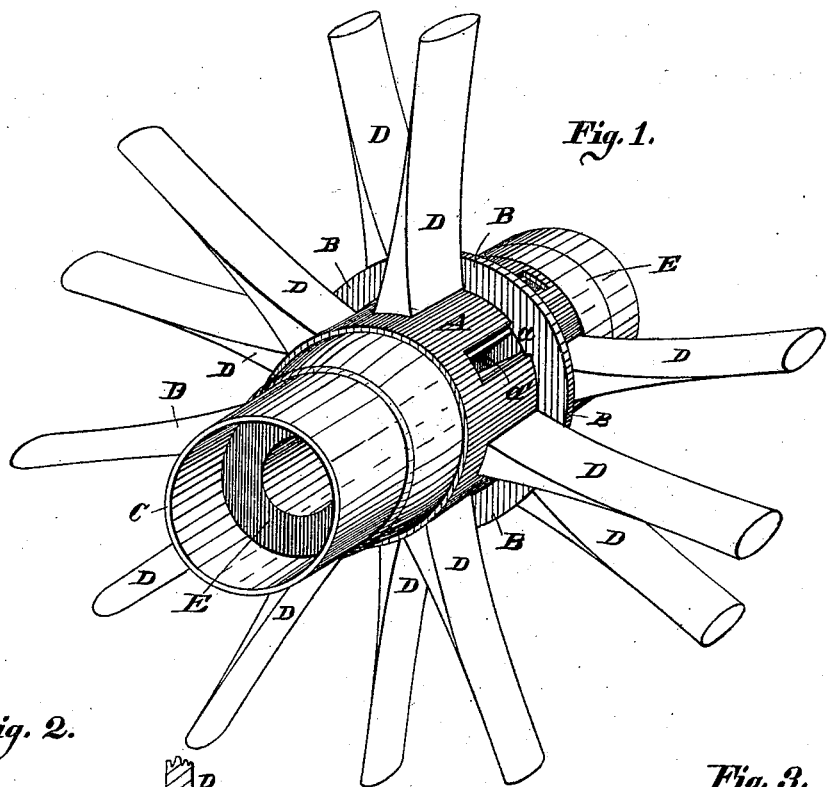
Figure 2:
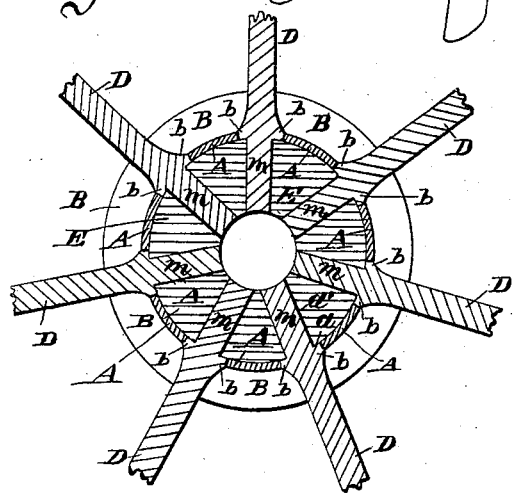
Figure 3:
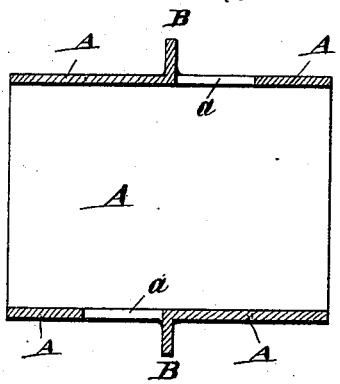

In the accompanying drawings, Figure 1 shows in perspective a hub embodying my improvements, so much of the staggered spokes being shown as to clearly illustrate the device. Fig. 2 is a cross-section taken in a plane at right angles to the longitudinal axis of the hub and one of the two series or circles of spokes. Fig. 3 is a central longitudinal section of the hub band.

A indicates a metal band fitted on a wooden hub, E, and provided with a central metal flange, B, extending outwardly from the periphery of the said band A. This flange B entirely surrounds the band, and is cast, forged, or otherwise formed, solid with it. The openings $a$ for the spokes are cut in the band close up to the flange B, as shown in Figs. 1 and 3. There are in the band a series of these spoke-openings, $a$, with their accompanying openings $a'$ on each side of the flange B, and these openings are so placed, the openings on one side of the flange B respectively alternating with those on the other side of the flange, as to make the staggered wheel as shown in Fig. 1. Each opening $a$ of the shell is provided with an accompanying opening or mortise, $a'$, in the wooden hub for the reception of the end or tenon $m$ of the wooden spoke, such opening $a'$ being radially underneath its respective opening $a$ of the wheel. This arrangement makes a wheel of great stiffness, and materially aids in preventing lateral deflection, wrenching, or twisting of the wheel or dragging the spokes from the felly.

The manner of inserting the spokes into the hub is that shown in Fig. 2. In Fig. 2 the openings $a$ are shown large enough to accommodate the shoulders $b$ on the end of the spoke. The shoulders $b$ enter the iron band A and rest directly on the wooden hub. These shoulders thus lie within the band A. The full thickness of the spoke thus enters the band, and is protected by the latter. The full strength of the spoke is retained. Each shoulder of the spoke is braced by the adjacent edge of the band A, and the spoke is thus thoroughly secured from deflection in a line running around the hub and in a plane at right angles to the longitudinal axis of the hub. At the same time each spoke is strongly braced and prevented from deflection in the direction of the length of the hub by means of the vertical metallic band or flange B, made solid to the metal band A; but, if desired, the shoulder of the spoke and the opening $a$ may be relatively of such size as that the shoulder may rest on the top of the band.

The shape of the terminal or end portions of the hub may be varied as desired.

The hub-band A may, when desired, be made continuous with the cap C or its band instead of being separate, as shown in Fig. 1. This would make a metallic cover for the hub-shoulder now unprotected, and would certainly add to the strength of the hub.

What I claim as new and of my invention, and desire to secure by Letters Patent, is—

A band for wheel-hubs, consisting of the sleeve A, having a flange, B, integral therewith, and extending from the sleeve in a plane which bisects the axis of the sleeve at a right angle, said sleeve having openings alternating at opposite sides of the plane faces of the flange, substantially as described.

JOHN A. SCHULER.

Attest:
JNO. W. STREHLI,
O. M. HILL.